United States Patent
Chu et al.

(10) Patent No.: US 8,869,054 B2
(45) Date of Patent: Oct. 21, 2014

(54) FRAMEWORK FOR PERSISTENT USER INTERACTIONS WITHIN WEB-PAGES

(75) Inventors: Danae Candace Chu, San Jose, CA (US); Shruti Gandhi, Poughkeepsie, NY (US); Zachary Adam Garbow, Rochester, MN (US); Clara Chia-Yen Liang, San Jose, CA (US); Timothy M. Trifilo, Walden, NY (US)

(73) Assignee: International Business Machines Corporation, Armonk, NY (US)

( * ) Notice: Subject to any disclaimer, the term of this patent is extended or adjusted under 35 U.S.C. 154(b) by 1372 days.

(21) Appl. No.: 11/775,696

(22) Filed: Jul. 10, 2007

(65) Prior Publication Data

US 2009/0019372 A1  Jan. 15, 2009

(51) Int. Cl.
G06F 3/048 (2013.01)

(52) U.S. Cl.
USPC ........... 715/765; 715/749; 715/762; 715/788; 715/826

(58) Field of Classification Search
CPC ................................................ G06F 17/30867
USPC ................... 715/765, 788, 826; 719/321–327
See application file for complete search history.

(56) References Cited

U.S. PATENT DOCUMENTS

| | | | |
|---|---|---|---|
| 6,360,249 B1 | 3/2002 | Courts et al. | |
| 6,487,583 B1 | 11/2002 | Harvey et al. | |
| 6,519,629 B2 | 2/2003 | Harvey et al. | |
| 7,055,094 B2 | 5/2006 | Imielinski et al. | |
| 7,096,417 B1 | 8/2006 | Bennett et al. | |
| 7,627,828 B1 * | 12/2009 | Collison et al. | 715/752 |
| 7,761,507 B2 * | 7/2010 | Herf et al. | 709/204 |
| 2004/0122897 A1 * | 6/2004 | Seelemann et al. | 709/204 |
| 2005/0091179 A1 * | 4/2005 | Kalthoff et al. | 707/1 |
| 2005/0198124 A1 * | 9/2005 | McCarthy | 709/203 |
| 2005/0251462 A1 | 11/2005 | Nykamp | |
| 2006/0080405 A1 | 4/2006 | Gibson | |
| 2006/0095320 A1 * | 5/2006 | Jones | 705/14 |
| 2006/0173702 A1 * | 8/2006 | Saxena et al. | 705/1 |
| 2006/0263133 A1 * | 11/2006 | Engle et al. | 400/62 |

(Continued)

FOREIGN PATENT DOCUMENTS

| | | |
|---|---|---|
| TW | 507127 B | 10/2002 |
| TW | 200639683 | 11/2006 |

OTHER PUBLICATIONS

Wong et al.; Communication and Process simulation of set-based design for concrette Reinforment; © 2007; IEEE; 9 pages.*

(Continued)

*Primary Examiner* — Linh K Pham
(74) *Attorney, Agent, or Firm* — Patterson & Sheridan, LLP

(57) ABSTRACT

A method, article of manufacture, and apparatus for tracking user interactions comprising receiving a first request associated with a first user, to exchange a communication with a second user about one of a plurality of elements of a web-page, wherein the plurality of elements includes at least one of graphical elements and textual elements; in response to the first request, exchanging a communication between the first user and the second user; capturing the communication; storing an interaction object comprising the communication, wherein storing includes associating the interaction object with the one of the plurality of elements of the web-page; and serving a modified version of the web-page to a third user; wherein the modified version specifies the interaction object being associated with the one of the plurality of elements of the web-page.

18 Claims, 4 Drawing Sheets

(56) References Cited

U.S. PATENT DOCUMENTS

| | | | |
|---|---|---|---|
| 2007/0245249 A1* | 10/2007 | Weisberg | 715/758 |
| 2008/0091553 A1* | 4/2008 | Koski | 705/26 |
| 2008/0209327 A1* | 8/2008 | Drucker et al. | 715/733 |

OTHER PUBLICATIONS

Chuah et al.; Realty Instant Messaging: Injecting a Dose of Realty into Online Chat; © 2003; ACM; 2 page.*

Shek et al.; A Preliminary Assessment of Different Trust Formation Models: The Effect of Third Party Endorsements on Online Shopping; © 2003; IEEE; 10 pages.*

R. Baumgartner et al., "INSPEC: Supervised wrapper generation with Lixto," 2001.

Nathan Holmberg et al., "A Framework for Interactive Web-Based Visualization," ACM International Conference Proceeding Series, 2006 vol. 169, Proceedings of the 7th Australian User interface conference, vol. 50: pp. 137-144.

Joe Weakliam et al., "Implicit Interaction Profiling for Recommending Spatial Content," Geographic Information Systems, Proceedings of the 13th Annual ACM international workshop on Geographic information systems, 2005, pp. 285-294.

Adil Faisal et al., "INsite: Introduction to a generic paradigm for interpreting user-web space interaction," 1999, pp. 53-58, <http://infolab.usc.edu/DocsDemos/insite.ps.>.

Laila Paganelli et al., "Intelligent Analysis of User Interactions with Web Applications," International Conference on Intelligent User Interfaces, Proceedings of the 7th international conference on Intelligent user interfaces, 2002, pp. 111-118.

"tably—Numbly's Web 2.0 Sticky Tab," Numbly Copyright + Web 2.0 = Copyright 2.0, <http://numly.com/numbly/default.asp>.

* cited by examiner

FRAMEWORK FOR PERSISTENT USER INTERACTIONS WITHIN WEB-PAGES

BACKGROUND OF THE INVENTION

1. Field of the Invention

The field of the invention relates to website interaction, specifically to a framework for persistent user interactions within web-pages.

2. Description of the Related Art

The Internet provides the worldwide community a forum within which users from around the globe can engage in social networking, research, special interests, gaming and electronic commerce. Web sites serve as hosts, in essence, of users looking for, or engaging in particular interests.

Many sites provide their users with opportunities to interact with other users of their web-pages. For example, bulletin boards and web logs (blogs) are a forum for threaded conversations, whereby comments are temporarily preserved on a web-page for future visitors. However, bulletin boards and blogs are static tools, and do not give users a live, interactive experience.

Further, while interactions such as blogs and live chats are preserved, these static tools do not enable a user to readily identify interactive content relevant to only a segment of a web-page. For example, a news web site may list a number of stories, with pictures on one web-page. While a blog may capture relevant comments on a story or picture of interest, blog comments are typically located at the bottom of web-pages, and the comments are associated with the blog article as a whole and do not readily identify which element of the web-page is being discussed.

Some sites, such as e-commerce sites, provide limited opportunities for live interaction, such as a chat with a customer service representative to select a product, or with a technician to help solve a problem with a product. Some tools are available to even allow visitors of the same site to interact in real-time using chat and voice tools.

However, these interactions are not preserved for future third-party users of the web-page. Accordingly, future users can not readily avail themselves of an interaction that could provide real value, such as a future user with an interest in the same product, or a future user with an interest in a topic covered in a chat between two previous users.

In websites that do have interaction, the mechanism for interacting is supplied by the website itself. If the website owner does not provide a method of interacting with other users on the site, a visitor to the site has no recourse in the case they wish to discuss an aspect of the page.

Additionally, where a web-page offers a live chat to its users, the live chat is typically open to all users on that site, and the interactions are unrestrained, leading to content that serves no practical interest to many users of the web-page.

Accordingly, there remains a need for a framework for persistent user interactions within web-pages.

SUMMARY OF THE INVENTION

The present invention generally provides a method of tracking user interactions comprising receiving a first request associated with a first user, to exchange a communication with a second user about one of a plurality of elements of a web-page, wherein the plurality of elements includes at least one of graphical elements and textual elements; in response to the first request, exchanging a communication between the first user and the second user; capturing the communication; storing an interaction object comprising the communication, wherein storing includes associating the interaction object with the one of the plurality of elements of the web-page; and serving a modified version of the web-page to a third user; wherein the modified version specifies the interaction object being associated with the one of the plurality of elements of the web-page.

According to one embodiment of the invention, a computer-readable storage medium contains a program which, when executed, performs an operation comprising receiving a first request associated with a first user, to exchange a communication with a second user about one of a plurality of elements of a web-page, wherein the plurality of elements includes at least one of: graphical elements and textual elements; in response to the first request, exchanging a communication between the first user and the second user; capturing the communication; storing an interaction object comprising the communication, wherein storing includes associating the interaction object with the one of the plurality of elements of the web-page; and serving a modified version of the web-page to a third user; wherein the modified version specifies the interaction object being associated with the one of the plurality of elements of the web-page.

According to one embodiment of the invention, a system comprises a processor; an interaction manager on a web server which, when executed by the processor, is configured to receive a first request associated with a first user; retrieve a requested web-page; retrieve interaction content associated with the requested web-page; and send a modified web-page comprising interaction content, for the first user, wherein the interaction content indicates a communication between at least two users, and is associated with attributes identifiable by a browser.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
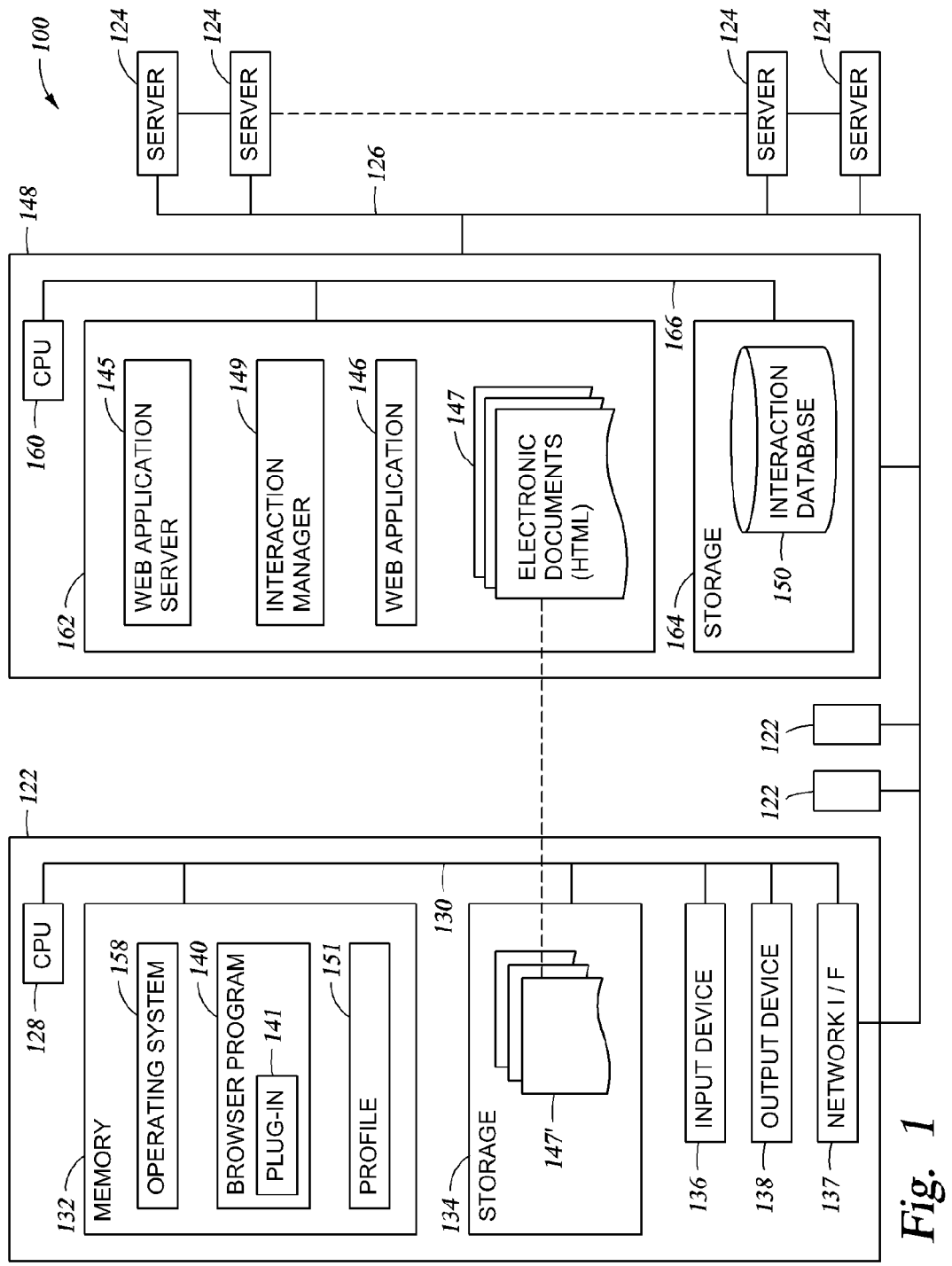
FIG. 1 depicts a block diagram of a networked system in which embodiments of the present invention may be implemented.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 depicts a block diagram of a networked system 100 in which embodiments of the present invention may be implemented. In general, the networked system 100 includes a client (e.g., user's) computer 122 (three such client computers 122 are shown) and at least one server 124 (four such servers 124 are shown). Server 148 illustrates at least one embodiment of a server 124. The client computer 122 and server computer 124 are connected via a network 126. In general, the network 126 may be a local area network (LAN) and/or a wide area network (WAN). In a particular embodiment, the network 126 is the Internet. Servers 124 may be distinct web servers for different websites. Such websites may include e-commerce sites, news sites, or any other website with a uniform resource locator, accessible from client computer 122 over a network 126, as described herein.

The client computer 122 includes a Central Processing Unit (CPU) 128 connected via a bus 130 to a memory 132, storage 134, an input device 136, an output device 138, and a network interface (I/F) device 137. The input device 136 can be any device to give input to the client computer 122. For example, a keyboard, keypad, light pen, touch-screen, trackball, or speech recognition unit, audio/video player, and the like could be used. The output device 138 can be any device to give output to the user, e.g., any conventional display screen or set of speakers, along with their respective interface cards, i.e., video cards and sound cards (not shown). Although shown separately from the input device 136, the output device 138 and input device 136 could be combined. For example, a display screen with an integrated touch-screen, a display with an integrated keyboard, or a speech recognition unit combined with a text speech converter could be used.

The network interface device 137 may be any entry/exit device configured to allow network communications between the client computer 122 and the server computers 124 via the network 126. For example, the network interface device 137 may be a network adapter or other network interface card (NIC).

Storage 134 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 132 and storage 134 could be part of one virtual address space spanning multiple primary and secondary storage devices.

The client computer 122 is generally under the control of an operating system 158, which is shown in the memory 132. Illustrative operating systems, which may be used to advantage, include Linux and Microsoft Windows. More generally, any operating system supporting the browser 140 functions disclosed herein may be used.

The memory 132 is preferably a random access memory sufficiently large to hold the necessary programming and data structures of the invention. While the memory 132 is shown as a single entity, it should be understood that the memory 132 may in fact comprise a plurality of modules, and that the memory 132 may exist at multiple levels, from high speed registers and caches to lower speed but larger DRAM chips.

Illustratively, the memory 132 includes an application 140 that, when executed on CPU 128, provides support for exchanging information between the various servers 124 and locating network addresses at one or more of the servers 124. In one embodiment, the application 140 is a browser that includes a web-based Graphical User Interface (GUI), which allows the user to navigate and display web-pages located on the Internet. However, more generally the application may be a thin client application configured to transfer data (e.g., HTML, XML, etc.) between the client computer 122 and the servers 124 via, for example, HTTP. By way of example only, the application 140 will be referred to herein as a browser. According to one embodiment of the invention, browser 140 may contain a plug-in 141. A plug-in is a helper program known in the art to accomplish certain functions relevant to browser 140 content, but outside of browser 140 functionality.

Memory 132 also includes a profile 151. According to one embodiment, profile 151 is a collection of user preferences, enabling a user to make selections restricting interaction content shown on a web-page. Interaction content is described below in FIG. 2.

Server computer 148 generally comprises a CPU 160, a memory 162, and a storage device 164, coupled to one another by a bus 166. The storage device 164 may hold an interaction database 150. The interaction database 150 may be any database application containing interaction objects. Interaction objects may be historical records of user interactions on web-pages. By way of example, the user interactions could be voice recordings, instant messaging chat sessions, or images, exchanged between at least two users visiting the same web-page. In one embodiment, a user interaction may be some combination of voice recordings, instant messaging chat sessions, or images, exchanged between two or more users visiting the same web-page. For sake of clarity, the term, chat, is used as a shorthand for the variety of interactions contemplated.

The memory 162 may be a random access memory sufficiently large to hold the necessary programming and data structures that are located on the server computer 148. The programming and data structures may be accessed and executed by the CPU 160 as needed during operation. As shown, the memory 162 includes a web application server 145, a web application 146 and an interaction manager 149.

The web application server 145 is adapted to service requests from the client computer 122 which invoke the web application 146 or the interaction manager 149. In turn, the web application 146 may perform various functions which include generating, accessing and/or populating electronic documents 147 (e.g., markup language documents such as HTML documents and XML documents) residing on the server computer 124

The interaction manager 149 may perform various functions as well, such as running queries and updates against the interaction database 150. The interaction manager 149 may also generate, access, populate, or modify electronic documents 147. As used herein, an "electronic document" is machine-readable data, regardless of the medium of storage or transmission. In one embodiment, the documents 147 are web-pages each having an associated network address. Although the documents are shown in FIG. 1 residing on the server computer 124, it should be understood that the documents 147 need not be static, but instead may be generated by the web application 146, and updated by the interaction manager 149.

By way of illustration, the web application server 145 may be an instance of Apache, Tomcat or IBM WebSphere products. WebSphere is available from International Business Machines, Inc. Further, the web application 146 may be configured to access a back end database, such as the interaction database 150, or perform other functions. By way of illustration, the web application 146 may be a stock quote retrieval application, an e-commerce application such as eBay, or an e-business application such as IBM Connect, or a Portal environment such as IBM websphere portal server, which runs in an application environment. However, more generally, it is contemplated that the invention is adaptable to any application server and applications.

According to one embodiment of the invention, when a user visits a web-page, the web application 146 may generate a document 147, e.g. the web-page requested, and then invoke the interaction manager 149. The interaction manager 149 then retrieves interaction objects from the interaction database 150 based on the user profile 151, and integrates interaction objects from the database 150 matching user profile 151 into the document 147.

The document 147 may then be served to a requesting browser 140 on a respective client computer 122. The browser 140 may display the document 147 showing icons indicating interaction objects, each icon associated with an element within the web-page. As an example, an interaction icon could appear near a picture element on the web-page. In one embodiment, the interaction icon may indicate an interaction object of a historical chat about the picture element. Additionally or alternatively, the icon may indicate a number of ongoing chats with respect to the picture element. These and other embodiments will be described in more detail below with respect to FIG. 2.

FIG. 1 illustrates at least one embodiment in which the interaction manager 149 resides on the same server computer that serves the web-pages being requested by the various client computers 122. In this case, any number of the servers 124 may be similarly configured.

In another embodiment, server 148 is a dedicated interaction manager server, distinct from servers 124. In such an arrangement, web application 146 resides on servers 124, with requisite web application server 145, memory 162, and storage 164, but without an interaction database 150. In this case, the browser programs 140 of the respective client computers 122 initiate requests for web-pages which are first received by a dedicated interaction manager server 148. The interaction manager server 148 then forwards the request to the appropriate target web server 124, according to conventional Internet protocol. To ensure that all browser requests are first received by the interaction manager server in this manner, the browser programs 140 may include an appropriate plug-in which wraps the URL of the target web server 124 with the address of the interaction manager server 148. The interaction manager server 148 then extracts the URL of the target web server 124 and initiates an HTTP request to the extracted URL. The target web server (having an address corresponding to the extracted URL) receives the request and serves the requested web-page to the interaction manager server 148. The interaction manager server 148 then modifies the web-page with appropriate interaction content (from the interaction database 150) specific to that page, and returns the page to the requesting browser program 140.

According to another embodiment, plug-ins within the browser programs 140 of the respective client computers 122 may initiate two separate requests. The plug-ins of browser programs 140 send one request (for a web-page), to the appropriate target web server 124, according to conventional Internet protocol. The target web server receives the request and serves the requested web-page to the browser program 140 on client computer 122.

The plug-ins of browser programs 140 may send another request (for interaction content) to the interaction manager server 148. The interaction manager 149 then retrieves appropriate interaction objects from the interaction database 150, for interaction content specific to the web-page requested and a user profile 151, and returns the interaction objects to the requesting browser program 140.

When the browser program 140 receives responses from both the target web server 124 and the interaction manager server 148, the plug-in modifies the web-page returned from the web server 124 with the interaction content from interaction manager server 148. Browser 140 then renders the modified web-page to the user.

FIG. 1 is merely one hardware/software configuration for the networked client computer 122, server computer 124 and interaction manager server 148. Embodiments of the present invention can apply to any comparable hardware configuration, regardless of whether the computer systems are complicated, multi-user computing apparatus, single-user workstations or network appliances that do not have non-volatile storage of their own. Further, it is understood that while reference is made to particular languages, including HTML, XML and JAVA, the invention is not limited to a particular language, standard or version. Accordingly, persons skilled in the art will recognize that the invention is adaptable to other languages and that the invention is also adaptable to future changes in a particular language as well as to other languages presently unknown. Further, the server 145 and application 146 are merely illustrative and other embodiments adapted to support any known and unknown protocols/functions are contemplated.

Figure 2:
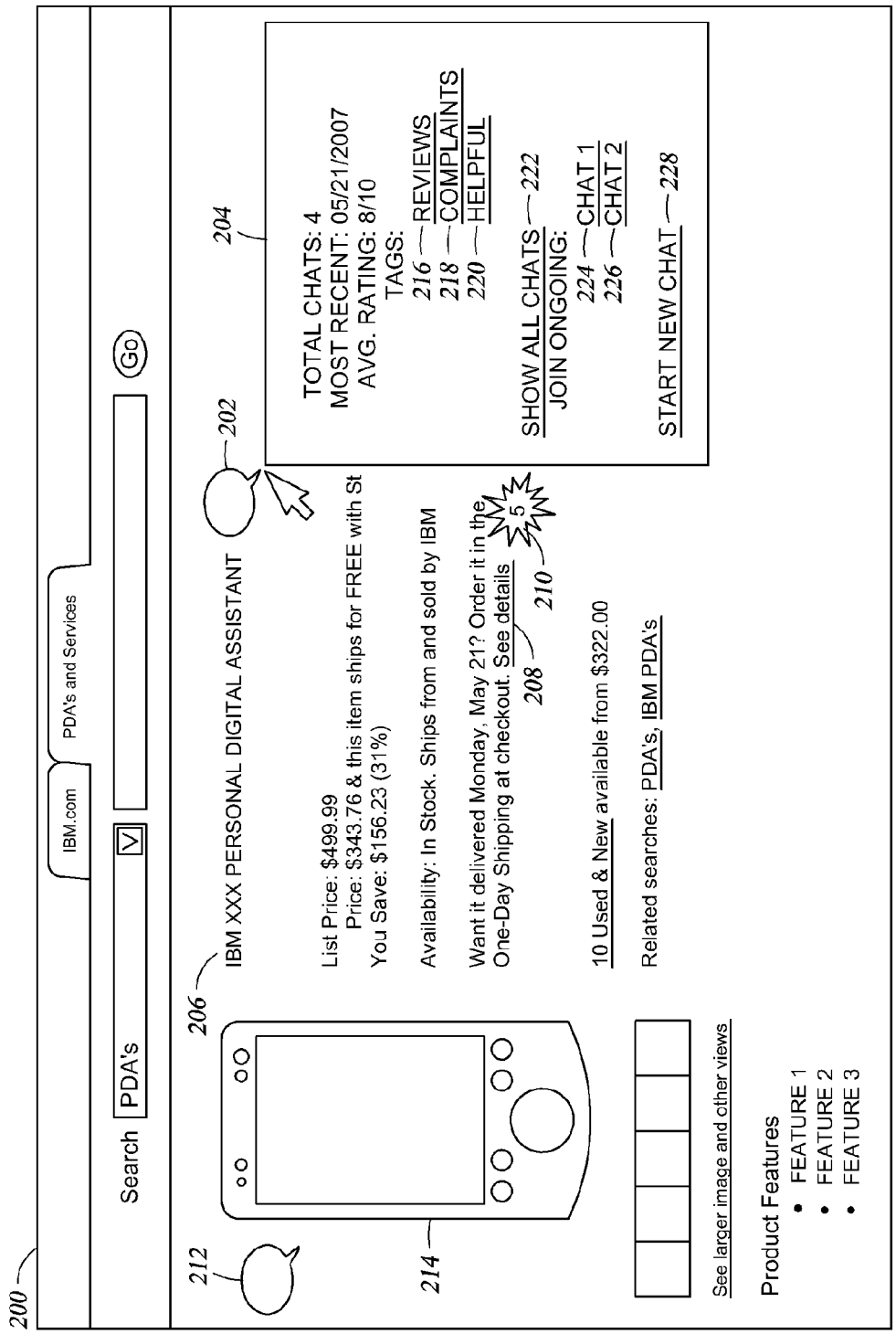
FIG. 2 depicts a web-page displaying interaction elements, according to one embodiment of the invention.

FIG. 2 depicts a web-page 200 displaying interaction elements according to one embodiment of the invention. Web page 200 may be rendered by the browser 140 of FIG. 1 according to content and instructions received from the server 148 and/or other servers 124, of FIG. 1, as explained above.

Web-page 200 contains interaction icons 202, 210, and 212, interaction summary element 204, web-page elements 206, 208, and 214, and interaction hyperlinks 216, 218, 220, 222, 224, 226, and 228. According to one embodiment of the invention, web-page 200 may include interaction icons such as 202, 210, and 212 only when interaction manager 149 retrieves interaction objects from interaction database 150 for web-page elements 206, 208, and 214, respectively. The proximity of interaction icons to web-page elements indicates an association, such as icon 202 to element 206, icon 210 to element 208, and icon 212 to element 214. In one embodiment, the icons 202, 210 and 212 are stored in and retrieved from the interaction database 150 shown in FIG. 1.

In one embodiment of the invention, when a user positions their mouse cursor over icon 202, the browser displays summary element 204. Element 204 shows some basic statistics in the first three lines. The basic statistics may show data relevant to helping a user decide whether viewing chats associated with element 206 would be useful. For example, "Total chats: 4," indicating the total number of chats stored in the interaction database 150 and associated with the current web page or element of the web page; "Most recent: May 21, 2007," indicates the date of the most recently stored chat; "Avg. rating 8/10," indicates the average of all ratings against all of the stored chats with respect to element 206, (ratings will be described in greater detail below).

Hyperlinks 216, 218, and 220 illustrate tags that categorize the stored chats discussed above. A tag is a label that a user associates with a chat. In one embodiment, a user may place a tag on a chat that the user just participated in. Additionally, a user that views a chat may also associate a tag to the chat. The tags help future users determine whether a particular chat is relevant to the future user's interests.

In an advantage, providing tags as hyperlinks allows a user to click on a particular hyperlink and view the associated chats. In one embodiment, when a user clicks on hyperlink 216, the web browser renders a new web-page showing the chats tagged as reviews. When a user clicks on hyperlink 218, the web browser renders a new web-page showing the chats tagged as complaints. When a user clicks on hyperlink 220, the web browser renders a new web-page showing the chats tagged as helpful.

Similarly, both participating and viewing users may associate a rating to a chat. In one embodiment, a rating is a user's evaluation of the quality of a chat measured on a scale from one to ten, with a one being a low quality chat, and a ten being the highest quality chat. As multiple users rate chats, a consensus opinion emerges on the quality of a particular chat, reflected in the, "Avg. rating," discussed above. By viewing the, "Avg. rating," future users can determine whether chats for a web-page element 206 are worth viewing.

Many options exist for possible tags. In embodiments of the invention, the browser 140 may restrict the choices for tags to a set list, or allow users to create tags as they see fit. According to one embodiment of the invention, a user could tag different segments of a chat individually. For example, where the participants in a chat discuss important information, the user could tag that segment as helpful; where the discussion digresses, the user could tag that segment as irrelevant.

Hyperlink 222 enables a user to view all stored chats regarding web-page element 206. When a user clicks on hyperlink 222, the browser 140 renders a new web-page that shows all stored chats associated with element 206.

According to one embodiment of the invention, a user profile, such as profile 151 in FIG. 1 could provide a filter for interaction content displayed on web-page 200. For example, a user profile could contain a user preference to only view interaction content with at least a rating of 8. In such a case, the summary element 204 displays only the number of, "Total chats," with at least an 8 rating, the most recent date of a chat with at least an 8 rating, hyperlinks for tags to chats with at least an 8 rating. Further, the hyperlink 222 would only display chats with at least an 8 rating. Alternatively, a user profile could contain a user preference to only view interaction content tagged as helpful, or as a review, with summary element 204 modified as described above. As apparent to one skilled in the art, there are a myriad of options for creating a user profile 151, such as that described above.

Advantageously, a user may define an individualized profile 151 to set limits on the chats available for viewing. Given the wide availability of the web, the number of chats for any web-page element could be astronomical, and therefore make relevant information difficult to find. However, by filtering out chats in irrelevant categories, or segments of chats that digress from relevant topics, a user may hone in on a manageable subset of chats to aid any particular pursuit. To this end, the selection criteria specified in a given user profile 151 is compared to the selection criteria defined by the tags for various web-page elements in order to identify information relevant to the user.

Hyperlinks 224 and 226 enable users to join ongoing chats. An ongoing chat is a communication session between two or more users currently visiting web-page 200. FIG. 2 shows that there are two ongoing chats regarding element 206. When a user clicks on hyperlink 224, the user is added to the chat participants for chat 1, allowing the user to view the chat content so far for chat 1, and to contribute chat content to the rest of chat 1. Similarly, when a user clicks on hyperlink 226, the user is added to the chat participants for chat 2, allowing the user to view the chat content so far for chat 2, and to contribute chat content to the rest of chat 2.

Further, hyperlink 228 enables a user to initiate a new chat session to discuss element 206. In an advantage, if the user has joined chats 1 and 2, and found the content irrelevant to the user's interests, the user can initiate a new chat session. By clicking on hyperlink 228, a new hyperlink is added to the ongoing chats. Users viewing summary element 204 after chat 3 is started will be able to join the new chat by clicking on a new hyperlink under hyperlink 226 labeled, "chat 3."

In the cases where the user engages in chats, an interaction manager 149 could store the contents of the chat in an interaction database 150, at the conclusion of the chat.

In one embodiment of the invention, icon 210 may indicate the number of interaction objects associated with a target page. For example, the hyperlink 208 may point to a target page, and the interaction element 210 may indicate the number of interaction objects associated with that target page. On the basis of the number of interaction objects indicated, a user may decide whether to click on the hyperlink 208. For example, if the interaction element 210 indicates a relatively high number of interaction objects associated with the target page, the user may be motivated to visit that page because the relatively high number of interaction objects suggests that other users frequently visit the target page. Icon 210 is illustrated as an explosion image to distinguish icon 210 from icons 202 and 212, which allow users to view summary elements, such as that described for summary element 204.

Advantageously, a user could single out a particular element of interest on a web-page, and readily determine whether there is relevant interactive content available regarding that element, based on the provision of an interaction element associated with that element. Further, a user could initiate or join in chats with users visiting the web-page at the same time, and discuss a particular element of interest. When chats conclude, their contents are preserved for future users to view, including third-party users.

Figure 3:
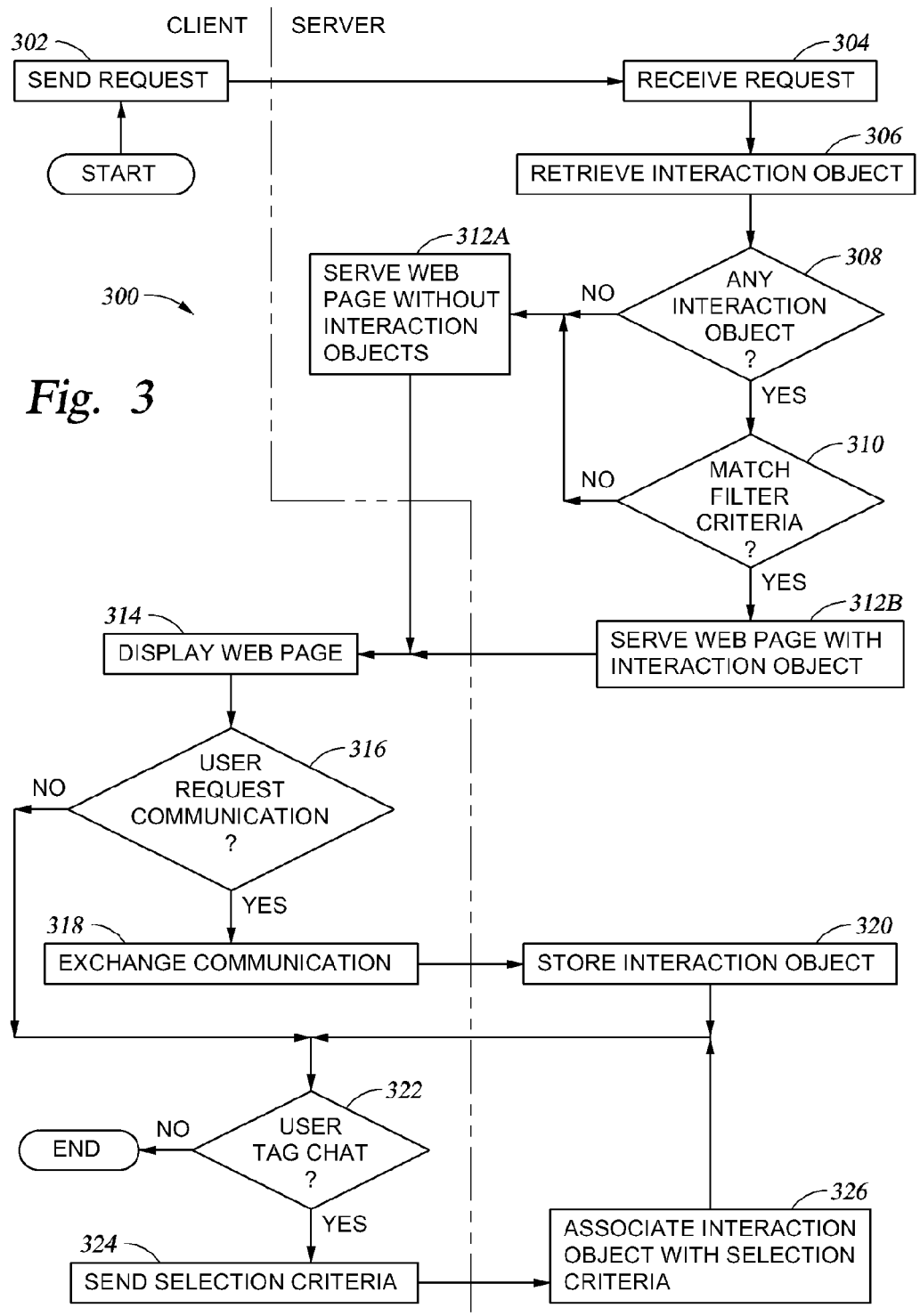
FIG. 3 depicts a flowchart illustrating a process flow for maintaining a framework for persistent user interactions within web-pages, according to one embodiment of the invention.

FIG. 3 depicts a flowchart illustrating a process flow 300 for maintaining a framework for persistent user interactions within web-pages, according to one embodiment of the invention.

At step 302, a user initiates a request for a web-page via a click on a hyperlink, such as hyperlink 228 in FIG. 2. In one embodiment of the invention, a user may maintain a profile, such as profile 151 described in FIG. 1, indicating user preferences, such as filtering criteria for viewing chats. For example, a user may restrict viewed chats by category, such as selecting one or more of the tags shown in FIG. 2. Further, a user could filter out chats that fall below a particular rating level. Accordingly, the browser 140 may send filtering criteria, as indicated by a user profile 151, within the request at step 302.

The web application server 145 and the web application 146 may initially handle the request, then pass off the request to the interaction manager 149. At step 304, the interaction manager receives the request.

At step 306, the interaction manager may initiate a query against interaction database 150 to retrieve all available interaction objects, e.g. chats, for the requested web-page.

At step 308, the interaction manager 149 checks whether any stored interaction objects are retrieved from interaction database 150. If so, at step 310, the interaction manager 149 checks whether the filtering criteria (if any) included with the request matches the selection criteria of the interaction objects. If so, at step 312B, the interaction manager 149 may serve the web-page to the user, the web-page containing the interaction objects, along with interaction icons, such as icons 202 and 212.

If the filtering criteria does not match any selection criteria of the retrieved chats, or there are no retrieved chats for the web-page, at step 312A, the interaction manager 149 may serve the web-page to the user without interaction objects. However, the served web-page may include interaction icons, such as icons 202 and 212, which enable the user to create new interaction objects for the web-page.

At step 314, the browser 140, displays the web-page rendered by the interaction manager 149. At step 316, the browser 140 may determine whether the user is requesting a communication with (an)other user(s). If so, at step 318, the browser 140 may initiate a session during which the users exchange communications, e.g., chat. At the conclusion of the chat, the browser 140 may capture the chat, and send an interaction object comprising the chat to the server 148.

At step 320, the interaction manager 149 stores the received interaction object containing the chat in interface database 150. In another embodiment, the chat session is hosted by the interaction manager server 148 and, accordingly, upon conclusion of the chat, the interaction manager server 148 may create and store the interaction object containing the chat in the database 150.

At step 322, the browser 140 could determine whether the user wants to tag the just-concluded chat. In embodiments of the invention, a tag could indicate categories such as those shown in hyperlinks 216, 218, and 220 in FIG. 2, or more specific categories reflective of the subject matter of the respective web-page element, such as computers, or botany. Another possible tag could be a rating of the chat, also described in FIG. 2.

At step 324, if the user tags the chat, the browser 140, sends the tag to the server 148. At step 326, the interaction manager 149 stores the tag as selection criteria within interaction database 150, and associates the selection criteria with the appropriate interaction object. In the case where the user tags different segments of the chat, the interaction manager 149 could store the chat as multiple interaction objects, and associate each selection criteria accordingly.

It should be understood that the steps above are not limited structurally to take place on a client or server, as described. Different functionalities, such as filtering interaction objects and composing web-pages could take place on either a client or a server. The examples cited above are merely illustrative, and are not intended as a limitation on the architecture of any particular implementation.

Figure 4:
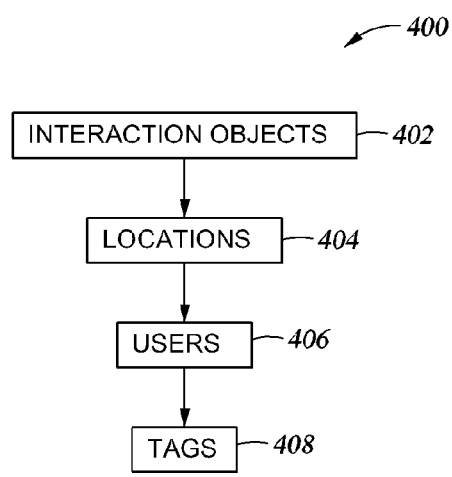
FIG. 4 illustrates a database for maintaining persistent user interactions within web-pages, according to one embodiment of the invention.

FIG. 4 illustrates a database 400 for maintaining persistent user interactions within web-pages, according to one embodiment of the invention. Database 400 illustrates one embodiment of interaction database 150, described in FIG. 1. The database 400 includes an interaction objects table 402, a locations table 404, a users table 406 and a tags table 408.

The interaction objects table 402 may contain all chats stored in the database 400. Depending on the implementation, the table 406 could contain one record for each chat, detailing a chat type, e.g., voice, instant messaging or images. In one embodiment of the invention, a single chat could be organized within many records in interaction objects table 406, using a single identifier that would facilitate reassembly of the entire chat.

Each chat contained in the interaction objects table 402 is associated with a particular web-page element of a given web-page. Accordingly, the locations table 404 may contain one record for each web-page element associated with a chat stored in interaction objects table 402. In one embodiment of the invention, each record may contain a uniform resource locator (URL), and attributes for a web-page element, the attributes being recognizable to a browser for rendering a web-page containing that element. The attributes may be hypertext markup language (HTML), or extensible markup language (XML), or any language or formatting enabling a browser 140 to render a web-page, such as web-page 200, positioning interaction icons near associated web-page elements.

The users table 406 may contain one record for each user that participates in a chat stored in the interaction objects table 402. Each record of the users table 406 may detail relevant information about a user. The relevant information could be as limited as a user id, or as expansive as name, address and social security number. In one embodiment of the invention, a user's account numbers could be recorded to facilitate e-commerce transactions. According to one embodiment of the invention, an interface could send a user's financial information to a web application, such as web application 146 associated with a web-page the user is viewing interaction information about.

The tags table 408 may contain all categorizations of chats stored in the interaction objects table 406. A record could contain a generic description, e.g. helpful, or critique. Alternatively, a record could contain an area of interest, e.g., computers, or flowers. In one embodiment of the invention, tags could define social networks. Accordingly, users could filter out viewable chats by defining a social network in their profiles. For example, a group of friends could create a tag with a name for a social network, and then assign the respective user record (for each friend in the group) to that social network. Users could be assigned to a social network through a database relationship between the records in the tags table 408 and the users table 406. By placing the tag for the social network in a profile, a user could filter out all chats where none of the participants are a member of the social network.

Further, expertise levels for a user could be recorded in table 408. By recording an expertise level associated with a particular area of expertise for a user, other users could filter out chats that do not include participants having a minimum level of expertise in an area. In one embodiment of the invention, areas of expertise could be implemented as a record in the tags table 408 in a relationship with a record in the users table 406.

It should be understood that the database described above is not limited to a database software implementation. Rather, the description is intended as one possible organization of data in one embodiment of the invention. The tables discussed above could be implemented as flat files, key files, or any other data organization that facilitates the above description.

While the foregoing is directed to embodiments of the present invention, other and further embodiments of the invention may be devised without departing from the basic scope thereof, and the scope thereof is determined by the claims that follow.

What is claimed is:

1. A method of tracking user interactions, comprising:
   upon determining that a first user and a second user currently visiting a web-page are discussing at least one of a plurality of elements of the web-page in a real-time textual communication, capturing the real-time textual communication, wherein the plurality of elements includes at least one of graphical elements and textual elements;
   receiving a request for the web-page from a client device;
   generating a modified version of the web-page, wherein the modified version of the web-page specifies a first interaction object which includes at least a portion of the captured real-time textual communication and a second interaction object which specifies at least a second real-time communication related to at least one of the plurality of elements of the web-page; and
   upon determining the modified version satisfies selection criteria, serving the modified version of the web-page to the client device for display to a third user.

2. The method of claim 1 wherein the modified version of the web-page further specifies an ongoing interaction object associated with at least one of the plurality of elements of the web-page.

3. The method of claim 2, wherein the ongoing interaction object comprises at least one of:
   a pending request to exchange a communication; and
   an ongoing communication between two users.

4. The method of claim 1, wherein the real-time communication comprises instant messaging.

5. The method of claim 1, wherein the second real-time communication comprises voice over internet protocol (VOIP) communications.

6. The method of claim 1, further comprising associating the interaction object and the at least one other interaction object, with respect to the one of the plurality of elements of the web-page, and the at least one other element of the web-page, respectively, with at least one selection criteria indicating at least one of:
   a usefulness rating;
   a social network, wherein the social network comprises an identifier associated with a plurality of users;
   an expertise area for an expert user; and
   an expertise level associated with the expertise area for the expert user.

7. The method of claim 1, wherein the first user, second user and third user are all distinct from one another.

8. The method of claim 1, wherein the real-time communication is exchanged between a first client associated with the first user and a second client associated with the second user, wherein the real-time communication is exchanged between the first client and the second client by way of a chat server.

9. A non-transitory computer-readable storage medium containing a program which, when executed, performs an operation, comprising:
   upon determining that a first user and a second user currently visiting a web-page are discussing at least one of a plurality of elements of the web-page in a real-time textual communication, capturing the real-time textual communication, wherein the plurality of elements includes at least one of graphical elements and textual elements;
   receiving a request for the web-page from a client device;
   generating a modified version of the web-page, wherein the modified version of the web-page specifies a first interaction object which includes at least a portion of the captured real-time textual communication and a second interaction object which specifies at least a second real-time communication related to at least one of the plurality of elements of the web-page; and
   upon determining the modified version satisfies selection criteria, serving the modified version of the web-page to the client device for display to a third user.

10. The non-transitory computer-readable storage medium of claim 9, further comprising:
    capturing at least one other real-time communication between at least two other users about at least one other element of the web-page, wherein the modified version of the web-page further specifies at least one other interaction object comprising the captured at least one other real-time communication.

11. The non-transitory computer-readable storage medium of claim 10, further comprising associating the interaction object and the at least one other interaction object, with respect to the one of the plurality of elements of the web-page, and the at least one other element of the web-page, respectively, with at least one selection criteria indicating at least one of:
    a usefulness rating;
    a social network, wherein the social network comprises an identifier associated with a plurality of users;
    an expertise area for an expert user; and
    an expertise level associated with the expertise area for the expert user.

12. The non-transitory computer-readable storage medium of claim 9 wherein the modified version of the web-page further specifies an ongoing interaction object associated with at least one of the plurality of elements of the web-page.

13. The non-transitory computer-readable storage medium of claim 12, wherein the ongoing interaction object comprises at least one of:
   a pending request to exchange a communication; and
   an ongoing communication between two users.

14. The non-transitory computer-readable storage medium of claim 9, wherein the real-time communication comprises instant messaging.

15. The non-transitory computer-readable storage medium of claim 9, wherein the second real-time communication comprises voice over internet protocol (VOIP) communications.

16. The non-transitory computer-readable storage medium of claim 9, further comprising associating the interaction object, with respect to the one of the plurality of elements of the web-page, with at least one selection criteria indicating at least one of:
   a usefulness rating;
   a social network, wherein the social network comprises an identifier associated with a plurality of users;
   an expertise area for an expert user; and
   an expertise level associated with the expertise area for the expert user.

17. The non-transitory computer-readable storage medium of claim 16, further comprising:

receiving a web-page request associated with the web-page, wherein the request specifies a filtering selection criteria; and wherein the modified version of the web-page is served only after determining that the selection criteria matches the filtering selection criteria.

18. A system, comprising:
a processor device; and
a memory device containing a program, which, when executed by the processor, is configured to:
upon determining that a first user and a second user currently visiting a web-page are discussing at least one of a plurality of elements of the web-page in a real-time textual communication, capture the real-time textual communication, wherein the plurality of elements includes at least one of graphical elements and textual elements;
receive a request for the web-page from a client device;
generate a modified version of the web-page, wherein the modified version of the web-page specifies a first interaction object which includes at least a portion of the captured real-time textual communication and a second interaction object which specifies at least a second real-time communication related to at least one of the plurality of elements of the web-page; and
upon determining the modified version satisfies selection criteria, transmit the modified version of the web-page to the client device for display to a third user.

* * * * *